United States Patent [19]

Ozawa et al.

[11] Patent Number: 5,063,887

[45] Date of Patent: Nov. 12, 1991

[54] EXHAUST CONTROL VALVE SYSTEM FOR PARALLEL MULTI-CYLINDER TWO-CYCLE ENGINE

[75] Inventors: Toshikazu Ozawa; Yu Motoyama, both of Iwata, Japan

[73] Assignee: Yamaha Hatsudoki Kabushiki Kaishi, Iwata, Japan

[21] Appl. No.: 566,967

[22] Filed: Aug. 13, 1990

[30] Foreign Application Priority Data

Aug. 14, 1989 [JP] Japan .................................. 1-207915
Aug. 14, 1989 [JP] Japan .................................. 1-207916

[51] Int. Cl.$^5$ ............................................. F02B 33/04
[52] U.S. Cl. ............................. 123/65 PE; 123/73 C; 60/312
[58] Field of Search .............. 123/65 PE, 73 C, 65 V, 123/65 P, 323, 65 PD; 60/312

[56] References Cited

U.S. PATENT DOCUMENTS

| | | | |
|---|---|---|---|
| 4,321,893 | 3/1982 | Yamamoto | 123/65 PE |
| 4,706,617 | 11/1987 | Asai et al. | 123/65 PE |
| 4,776,305 | 10/1988 | Oike | 123/65 PE |
| 4,903,647 | 2/1990 | Yamamoto et al. | 123/65 PE |
| 4,920,932 | 5/1990 | Schlunke | 123/65 PE |

FOREIGN PATENT DOCUMENTS

| | | | |
|---|---|---|---|
| 58-5062 | 1/1983 | Japan . | |
| 63-173817 | 7/1988 | Japan | 123/65 PE |
| 63-255512 | 10/1988 | Japan | 123/65 PE |
| 63-255513 | 10/1988 | Japan | 123/65 PE |

*Primary Examiner*—David A. Okonsky
*Attorney, Agent, or Firm*—Ernest A. Beutler

[57] ABSTRACT

An exhaust control valve arrangement for an in-line, two-cycle, crankcase compression engine which permits the porting arrangement to be rotated relative to the cylinder bore axis to achieve a compact configuration and wherein all of the exhaust control valves are operated by a single shaft assembly that extends parallel to a plane containing the cylinder bore axes. As a result of this orientation, the exhaust control valves provide an asymmetric exhaust port opening under at least some operative positions of the valves when the valves are in a flow obstructing position. A number of embodiments are disclosed which configure the exhaust control valves so that the port is symmetric in at least some operative obstructing positions of the valves. Also, several embodiments using curved valve configurations are disclosed.

28 Claims, 3 Drawing Sheets

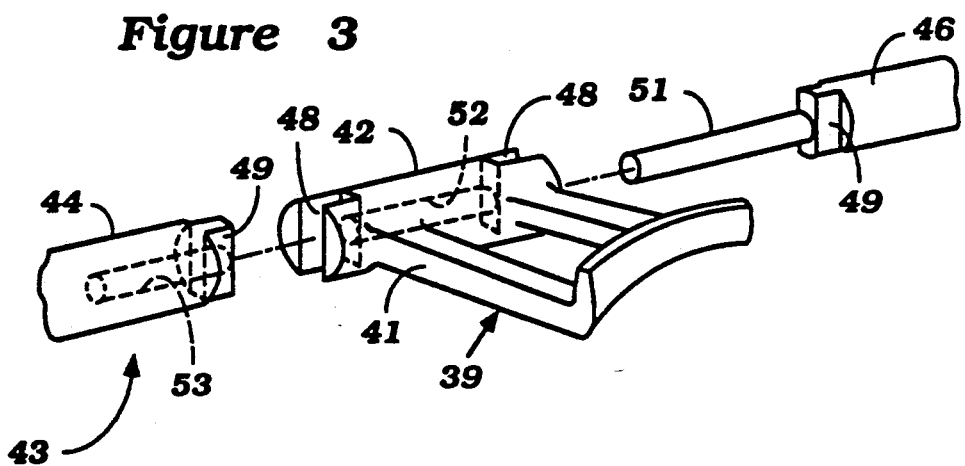
Figure 3
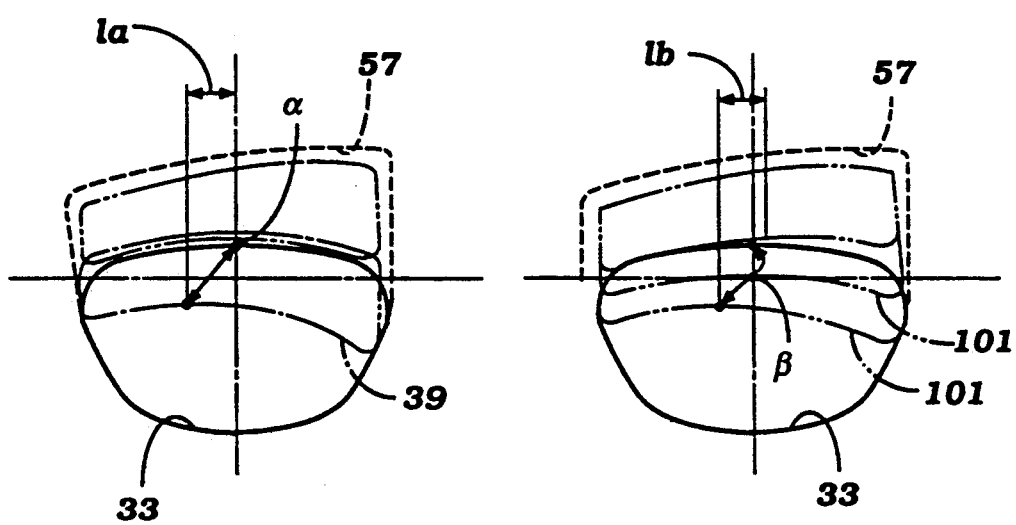
Figure 4
Figure 5
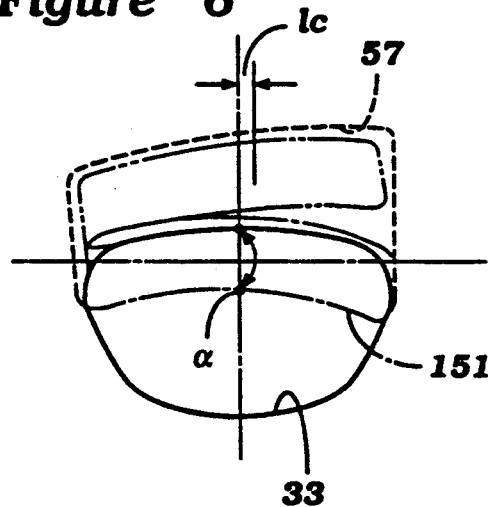
Figure 6
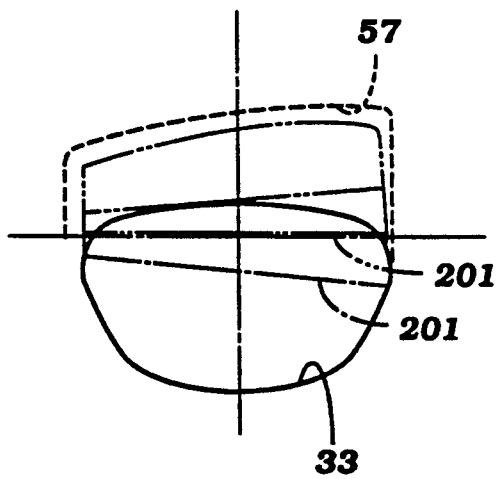
Figure 7

EXHAUST CONTROL VALVE SYSTEM FOR PARALLEL MULTI-CYLINDER TWO-CYCLE ENGINE

BACKGROUND OF THE INVENTION

This invention relates to an exhaust control valve system for a parallel multi-cylinder, two-cycle engine and more particularly to an improved exhaust control valve system for such an engine that permits a compact engine construction and near optimum running under all engine conditions.

As is noted in our copending application of the same title, Serial No. 07/566,968, filed Aug. 13, 1990, and assigned to the assignee hereof, the performance of an internal combustion engine operating on the two-cycle, crankcase compression principle can be improved through the use of an exhaust control valve that changes the port configuration and timing in response to engine running characteristics. That is, it is desirable to provide a large overlap to achieve high speed performance but such large overlaps reduce the performance at low and mid ranges. The use of an exhaust control valve can change the timing of the exhaust port so as to optimum at all running conditions.

In connection with the application of this principle, however and as noted in our aforenoted copending application, the positioning of the scavenge and exhaust ports can give rise to greater than desired engine length with inline engines. As also noted in that application, this problem can be overcome by rotating the ports about the cylinder bore axis so as to permit the ports of adjacent cylinders to nest between each other and thus reduce the engine length. However, this means that the exhaust port will then not extend in a direction perpendicularly to a plane containing the cylinder bore axes but is disposed at an acute angle to such a perpendicular plane. In the copending application, the control valves for the exhaust ports are mounted on shafts that extend perpendicularly to the center line of the exhaust passages and thus will provide a symmetrical port configuration regardless of the degree of opening or closure of the exhaust control valve.

The construction as employed in our aforenoted copending application, however, presents certain difficulties in valve actuation. Since the shafts are all parallel to each other rather than aligned, a somewhat complicated arrangement must be employed so as to insure that all valves will be positioned similarly in response to the varying engine condition. Although it is possible to achieve this result, the structure for doing so tends to become complicated.

It is, therefore, a principal object of this invention to provide an improved and simplified and yet compact control valve arrangement for the exhaust ports of a multiple cylinder, two-cycle internal combustion engine.

It is possible to provide an exhaust port configuration as described in our aforenoted copending application and wherein all of the control valves are affixed to a common shaft which does not extend perpendicularly to the axis of the exhaust ports. However, when this is done, the movement of the control valve element will cause a variation in the configuration or symmetry of the exhaust port depending upon the position of the control valve member. This can give rise to less than optimum performance.

It is, therefore, a further object of this invention to provide a control valve arrangement for the exhaust port of a two cycle internal combustion engine of the type wherein the axis of rotation of the control valve does not extend perpendicularly to the axis of the exhaust port and wherein the exhaust port and control valve are configured so as to minimize the amount asymmetry that occurs during the pivotal movement of the control valve.

It is, therefore, a still further object of this invention to provide an improved control valve arrangement for a multiple cylinder inline, two-cycle, crankcase compression engine having angular disposed exhaust passages and control valves that are operated by a common shaft that extends in a non-perpendicular relationship to the exhaust passages and wherein in at least one operative position of the control valve the exhaust port is symmetrical.

SUMMARY OF THE INVENTION

This invention is adapted to be embodied to be embodied in a multi-cylinder, two-cycle, crankcase compression, internal combustion engine having a cylinder block assembly defining a pair of adjacent cylinder bores having their axes lying in a common plane. A crankcase is positioned at one end of the cylinder block and scavenge port means comprising at least one scavenge passage extend from the crankcase to respective of the cylinder bores. An exhaust port is provided for each of the cylinder bores for discharging exhaust gases from the respective cylinder bore to the atmosphere. The exhaust port is disposed so that a line passing from the cylinder bore axis through the center of the exhaust port is disposed in non-perpendicular relationship to the plane and at an acute angle to a perpendicular plane. A pivoted exhaust control valve is provided for controlling the effective area and timing of opening of each of the exhaust ports.

In accordance with a first feature of the invention, the exhaust control valves are all affixed for rotation with a common control valve shaft which shaft extends parallel to the plane containing the cylinder bore axes.

In accordance with a further feature the invention, the exhaust control valves and exhaust ports are curved at the lower edge of the exhaust control valves and the upper edge of the exhaust control port to reduce the amount of lack of symmetry during pivotal movement of the control valves.

In accordance with another feature of the invention, the control valves are pivotally supported for movement between their control positions and are configured so that the effective exhaust port opening will be symmetrical about its center in at least one operative position of the control valve.

BRIEF DESCRIPTION OF THE DRAWINGS

FIG. 3 is a partially exploded perspective view showing the operative connection between the control valve elements and the control valve shaft.

FIG. 4 is a developed view showing the cooperation of the control valve with the exhaust port in accordance with a first embodiment of the invention.

FIG. 5 is a view, in part similar to FIG. 4 showing a second embodiment of the invention.

FIG. 6 is a view in part similar to FIGS. 4 and 5, showing a third embodiment of the invention.

FIG. 7 is a view, in part similar to FIGS. 4 through 6, and shows a fourth embodiment of the invention.

DETAILED DESCRIPTION OF THE PREFERRED EMBODIMENTS

Figure 1:
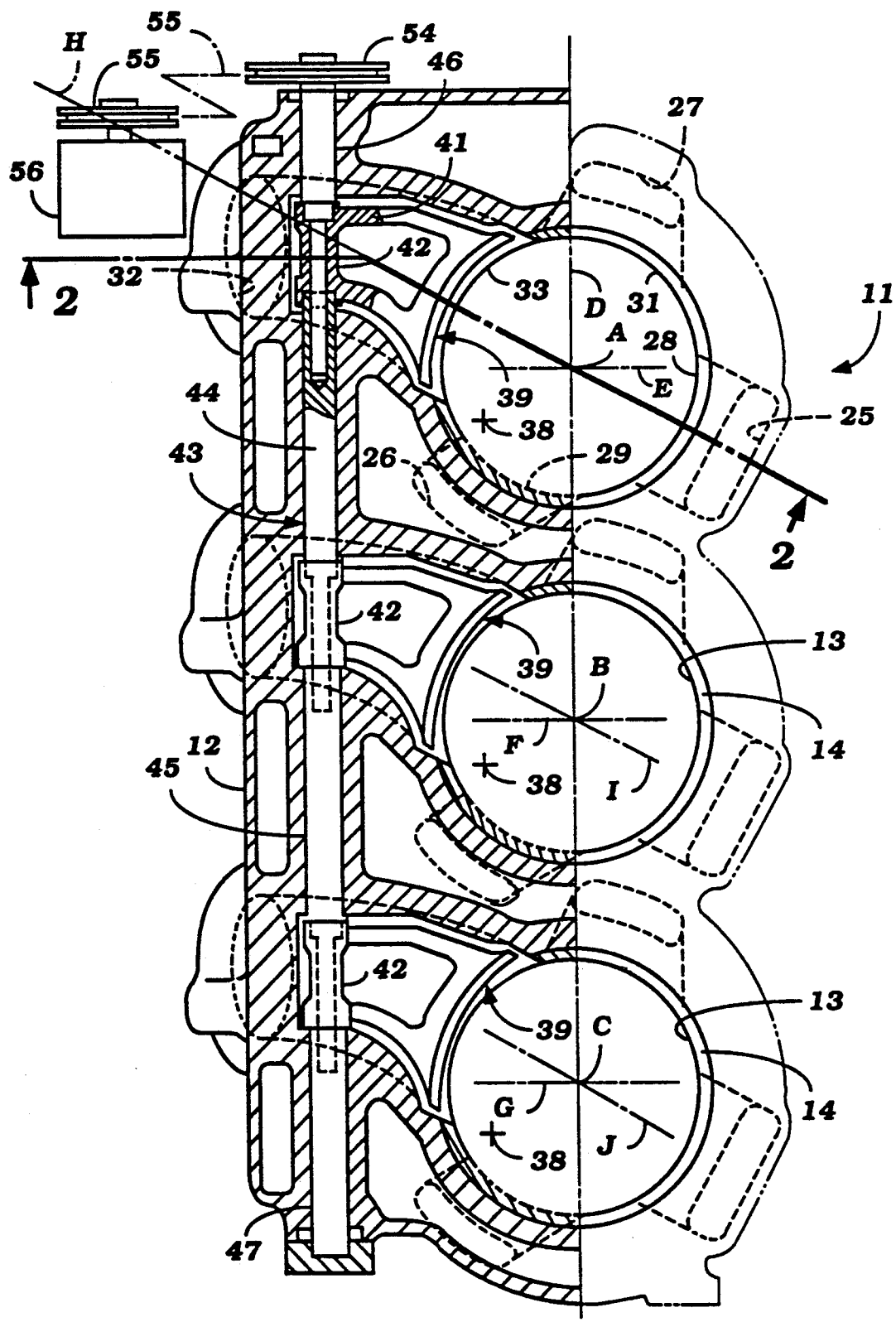
FIG. 1 is a partial cross-sectional view taken through along a plane extending perpendicularly to the cylinder bore axes of a multi-cylinder, two-cycle, crankcase compression engine constructed in accordance with an embodiment of the engine, with the exhaust control valve control mechanism being shown schematically and is taken generally along the line 1—1 of FIG. 2.
Figure 2:
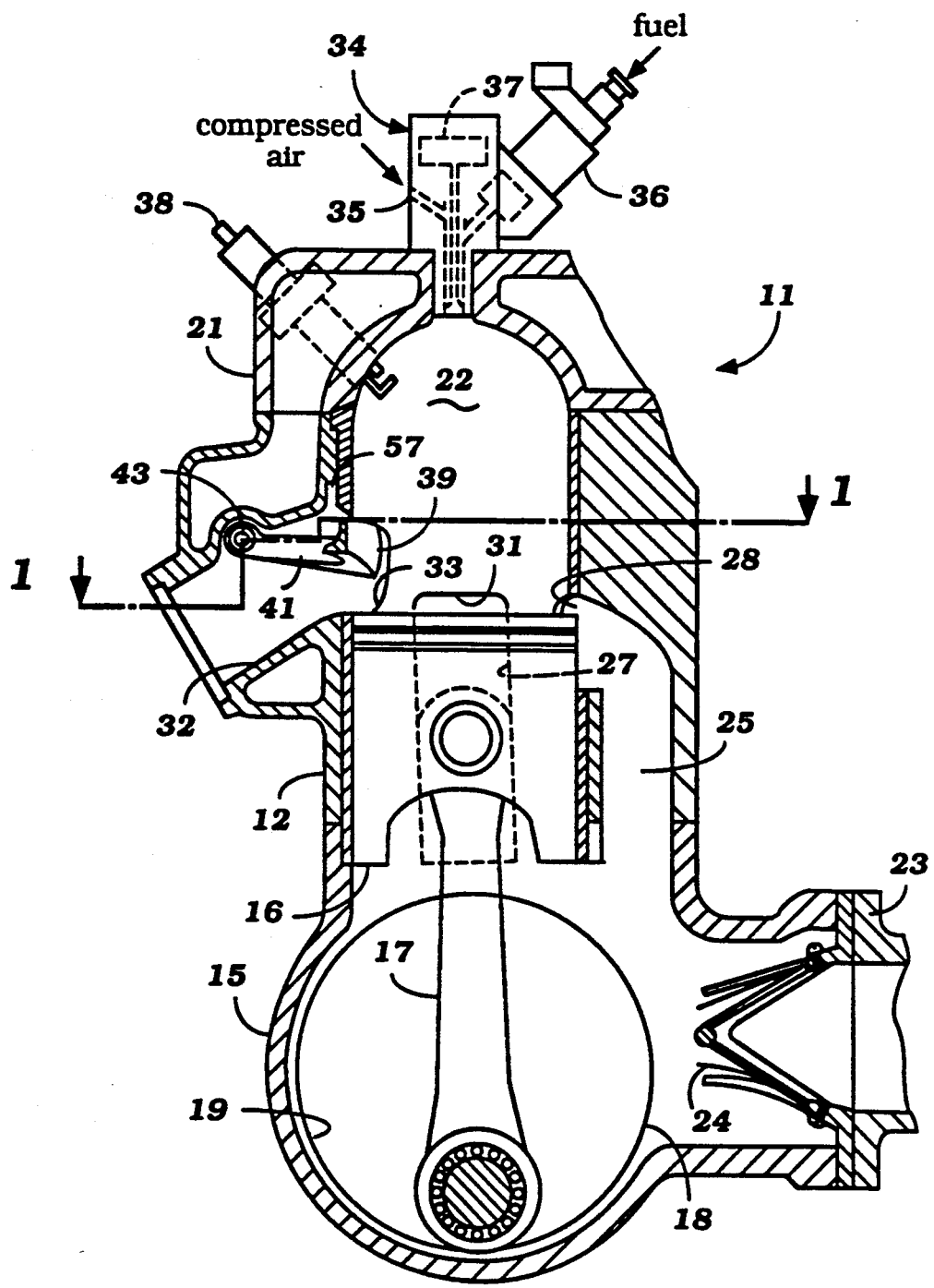
FIG. 2 is a cross-sectional view taken along the line 2—2 of FIG. 1.

Referring first to the embodiment of FIGS. 1 through 4, a two-cycle, crankcase compression, internal combustion engine constructed in accordance with this embodiment of the invention is identified generally by the reference numeral 11. In the illustrated embodiment, the engine 11 is of the three cylinder, in line type. It may be understood that the invention may be practiced in conjunction with engines having other numbers of cylinders and also with engines having V or opposed type configurations and two or more cylinders in each bank. It should be readily apparent to those skilled in the art how this invention can be practiced with such other engine configurations.

The engine 11 includes a cylinder block assembly 12 having three aligned cylinder bores 13 that are formed by pressed-in liners 14. The cylinder bores 13 have their respective axes A, B and C lying in a common plane, indicated by the reference character D in FIG. 1. A crankcase member 15 is affixed, in a known manner, to the lower end of the cylinder block 12 at one end of the cylinder bores 13. Pistons 16 are slidably supported within the cylinder bores 13 and are connected by means of connecting rods 17 to a crankshaft 18 that is journaled for rotation within individually sealed crankcase chambers 19 of the engine. The crankcase chambers 19 are formed between the lower end of the cylinder block 12 and the crankcase member 15 and are each sealed relative to each other, as is conventional with two-cycle engine construction.

A cylinder head, indicated generally by the reference numeral 21, is affixed to the cylinder block 12 at the end opposite the crankcase member 15 and is formed with respective recesses 22 which cooperate with the cylinder bore 13 and pistons 16 to form the combustion chambers of the engine.

A charge forming system is provided for the engine and in accordance with the illustrated embodiments, this charge forming system includes an intake manifold 23 that is affixed to one side of the crankcase member 15 and which communicates with the chambers 19 through a reed type check valve assemblies 24 which permit the flow of air into the crankcase chambers 19 but which prevents reverse flow when the piston 16 is compressing the air charge therein. In the embodiments of the invention, only pure air is inducted into the crankcase chambers 19. It is to be understood, however, that the invention can be utilized in conjunction with arrangements wherein a fuel/air charge is admitted to the crankcase chambers 19.

The charge which is admitted to the crankcase chambers 19 and which is compressed, as aforenoted, is transferred from the crankcase chambers 22 through three angularly disposed scavenge passages 25, 26 and 27. Although different number of scavenge passages may be employed, the invention has particular utility in conjunction with engines having a plurality of scavenge passages so that the normal disposition of the scavenge passages could cause an increase in length of the engine. The scavenge passage 25 may be considered to be a center scavenge while the passages 26 and 27 may be considered to be side scavenge passages.

In conventional arrangements, the scavenge passages 25 would lie on planes E, F and G which are perpendicular to the plane D and which extend at right angles thereto and which intersect the cylinder bore axes A, B and C. The side passages 26 and 27 would have their centers lying on the plane D. As should be readily apparent from an inspection of FIG. 1, this orientation would cause the engine to have a greater length than with the described embodiment to provide the necessary clearance for adjacent side scavenge passages.

However, in accordance with the invention, these passages are rotated about the respective cylinder bore axes A, B and C so that the centers of the side scavenge passages 25 lie on planes H, I and J that are disposed at an acute angle to the planes E, F and G. As a result, it can be clearly seen that a more compact engine is provided by this rotation of the scavenge passages without adversely affecting the flow area.

Each of the scavenge passages 25, 26 and 27 extends from the crankcase chambers 19 and enters the respective combustion chamber 22 through a respective scavenge port 28, 29 and 31. The scavenge ports 28, 29 and 31 subtend an arc that is greater that 180 degrees of the cylinder bore 13.

In confronting relationship to the scavenge passages 25, the cylinder block 12 is provided with exhaust passage 32 which extend from exhaust ports 33 that lie substantially within the quadrant defined by the planes D,E, D,F and D,G. The center of these passages 32 also lies along the planes H, I and J. This further adds in the compaction of the overall engine construction and affords good scavenging.

A fuel/air charge is admitted to the combustion chamber 22 by an air/fuel injector indicated generally by the reference numeral 34 and which has an air injector portion 35 that receives air under pressure from a suitable air compressor (not shown). In addition, a fuel injection nozzle 36 injects fuel with the flow of fuel and air into the combustion chambers 22 being controlled by a suitable valve mechanism operated by a solenoid 37. Since the construction of the fuel/air injector 34 forms no part of the invention and since any other charge forming system may be employed, further description of it is believe to be unnecessary.

The charge which is admitted to the chamber 22 is fired by a spark plug 38 in a known manner.

As has been previously discussed, it is desirable to provide a fairly substantial overlap in the operation of the scavenge ports 28, 19 and 31 and the exhaust port 33 to provide maximum power output. However, such maximum power output and high overlaps deteriorates the low speed performance. In order to obviate these problems, individual exhaust control valves, indicated generally by the reference numeral 39, are provided in each of the exhaust passages 32 for masking the exhaust ports 33 and changing the effective timing.

The exhaust control valves 39 in accordance with each embodiment of the invention, except for the shape of the face which confronts the exhaust port 33, have the same construction. Therefore, the following description of the embodiment of FIGS. 1 through 4 is also common for the embodiments of FIGS. 5 through 7 except for the actual configuration of this face of the valve 39.

Each valve 39 has a portion 41 that extends along the length of the exhaust passage 32 and which curves relative to the exhaust port 33 as clearly shown in FIG. 1. This portion 41 terminates in a cylindrical shank part 42 that has a connection to and forms a part of a control valve shaft assembly, indicated generally by the reference numeral 43. This shaft assembly 43 includes the control valve portions 42 and interconnecting shaft members 44 and 45 and end shaft members 46 and 47. These shaft members all lie within a bore formed in one side of the cylinder block 12 and which has an axis of rotation that is parallel to the plane D. A connection as best shown in FIG. 3 is provided with the valve portions 42 so as to permit the shaft assembly 43 to rotate as a unit while at the same time permit some axial movement so as to compensate for thermal expansion.

Referring now in detail to FIG. 3, it should be noted that the valve end portions are formed with grooves 48 that receive corresponding tongues 49 formed on the respective shaft portions 44, 45, 46 and 47. Hence, there is provided a keyed connection that insures that the shaft 43 will rotate as a unitary assembly.

At each connection to a valve portion 42 one of the shafts, the shaft 46 in FIG. 3, is provided with a cylindrical extension 51 that is received within a bore 52 formed in the valve portion 42 and a bore 53 formed in the other shaft portion (in this figure, the shaft portion 44) to further assist in alignment. This connection, of course, does permit some axial movement for the reasons as aforenoted.

A drive pulley 54 (FIG. 1) is affixed to one end of the shaft assembly 43 and is coupled by a flexible transmitter 54 to a pulley 55 affixed to the output shaft of a servo motor 56. The servo motor 56 is operated by any suitable control strategy so that the exhaust control valves 39 will be in an opened position at wide open throttle full load and gradually obstruct a portion of the exhaust port 33 as the engine load or speed decreases so as to retard the valve timing and obtain better running under low and mid speed conditions. Because of the curved relationship of the portions 41 of the valve members 39 and the fact that the axis of rotation of the shaft assembly 43 is not perpendicular to the face of the exhaust port 33, however, there will be some asymmetry as the valve member 39 is closed as may be best understood by reference to FIG. 4.

The valve member 39 has a face which cooperates with the valve port when in its restricting position and which extends into a recess 57 (FIGS. 2 and 4) formed between the cylinder liner 13 and the cylinder block 12 adjacent the exhaust port 32. In the embodiment of FIG. 4, the valve member 39 is provided with a generally curved lower surface, the curvature of which, in this embodiment, is complementary to the curvature of the upper end of the exhaust port 33. As shown in the dot-dot-dash line view of FIG. 4, when the valve member 39 is in its fully opened position, there will be no restriction of the exhaust port 33. However, when the valve member 39 moves to its full restricting position as occurs at idle, the curved surface will obscure part of the port 33 and delay the valve timing. However, it should be noted that the maximum point of curvature indicated by the point $\alpha$ moves from the center of the exhaust port as indicated by the vertical dot-dash line to a distance $1a$ to the left in FIG. 4. This determines the initial opening of the exhaust port 33 under each condition. However, because of the asymmetry of the port configuration, then there will be somewhat less than optimum performance. In order to compensate for this, the spark plug 38 may be positioned so that its gap is at the point shown in FIG. 1 by the cross in these figures so as to insure improved running.

The curvature of the face of the valve member 39 can be changed so that in at least some of the operative positions other than the wide open throttle position, the exhaust port is still symmetric. For example, the embodiment of FIG. 5 shows an arrangement wherein the part throttle, part load condition, as shown by the dash-dot-dot line view is still symmetrical. In this instance, the high point of the curvature B will still be on the center line as shown in this figure. However, when the valve, indicated in this embodiment by the reference numeral 101, moves to the idle position as shown by the dash-dot-dot line view, there will be asymmetry. The asymmetry is caused by the movement of the point $\beta$ to the distance $1b$ from the wide open throttle position.

FIG. 6 shows a curvature wherein the idle condition is maintained symmetrical and off idle condition will be asymmetrical. In this instance, the valve member is indicated by the reference numeral 151 and it will be seen that the high point of curvature $\alpha$ moves only slightly from the on center position as indicated by the dimension $1c$.

FIG. 7 shows another embodiment wherein the valve member, indicated generally by the reference numeral 201, has a straight edge on its lower face. This straight edge does not provide the optimum results as a curved edge because it cannot be as well tailored. By utilizing a curved lower surface of the control valve 39 and a curved upper surface of the exhaust port, the degree of change of symmetry or the amount of asymmetry can be reduced during the angular movement of the exhaust control valves as shown by the small movements of the points $\alpha$, $\beta$, and $\alpha$ in the embodiments of FIGS. 4 through 6. However, some tuning for the load ranges can be achieved as with the embodiments of FIGS. 4, 5 and 6.

It should be readily apparent from the foregoing description, therefore, that an improved exhaust control valve for an internal combustion engine operating on a two-cycle principle has been illustrated and described and which is effective in permitting a unitary shaft assembly that is disposed in a straight line and parallel to the plane containing the cylinder bore axes. Various tuning arrangements have also been disclosed wherein the exhaust port is symmetrical at least at some running conditions in addition to wide open throttle condition and also wherein the amounts of asymmetry can be reduced through the use of a curved lower edge of the control valve. Of course, the foregoing embodiments are only preferred embodiments of the invention and various changes and modifications may be made without departing from the spirit and scope of the invention, as defined by the appended claims.

I claim:

1. A multi-cylinder, two-cycle, crankcase compression internal combustion engine having a cylinder block assembly defining a pair of adjacent cylinder bores having their axes lying in a common plane, a crankcase member positioned at one end of said cylinder block, scavenge port means comprising at least one scavenge passage extending from said crankcase to the respective cylinder bore, an exhaust port for each cylinder bore for discharging exhaust gases from the respective cylinder bore to the atmosphere, each of said exhaust ports being disposed so that a line passing from the respective cylinder bore axis through the center of the exhaust port is disposed in non-perpendicular relationship to the said common plane and at an acute angle measured in the same direction to a perpendicular plane containing the respective cylinder bore axis, a pivoted exhaust control valve for controlling the effective area and timing of opening of each of said exhaust ports, and a common control valve shaft supported for rotation by said cylinder block about an axis parallel to the common plane and operatively connected to each of said exhaust control valves.

2. An engine as set forth in claim 1 wherein the connection between the control valve shaft and the exhaust control valves permit some axial movement therebetween while maintaining the angular relationship.

3. An engine as set forth in claim 2 wherein the axial movement is provided by a tongue and groove connection between the exhaust control valves and the control valve shaft.

4. An engine as set forth in claim 1 wherein the exhaust control valves have a configuration that permits the exhaust port to be fully opened when the exhaust control valves are in one position and partially obstructed when the exhaust control valves are in their idle position, said exhaust control valves being configured so that the effective exhaust port opening is symmetric in at least one operative position other than the full throttle position of the exhaust control valves.

5. An engine as set forth in claim 4 wherein the effective exhaust port opening is symmetric at the full throttle position of the exhaust control valves in addition to at least one operative position other than the full throttle position.

6. An engine as set forth in claim 4 wherein the effective exhaust port opening is symmetric at mid-range performance.

7. An engine as set forth in claim 6 wherein the effective exhaust port opening is symmetric at the full throttle position of the exhaust control valves in addition to at least one operative position other than the full throttle position.

8. An engine as set forth in claim 4 wherein the effective exhaust port opening is symmetric at the idle condition.

9. An engine as set forth in claim 8 wherein the effective exhaust port opening is symmetric at the full throttle position of the exhaust control valves in addition to at least one operative position other than the full throttle position.

10. An engine as set forth in claim 9 wherein a spark plug is positioned in the cylinder bore and is offset toward the greater effective area of the exhaust port relative to the cylinder bore axis.

11. An engine as set forth in claim 6 wherein a spark plug is positioned in the cylinder bore and is offset toward the greater effective area of the exhaust port relative to the cylinder bore axis.

12. An engine as set forth in claim 1 wherein the lower surface of the exhaust control valve is curved in plan view and the upper surface of the exhaust port is curved in plan view.

13. An engine as set forth in claim 12 wherein the exhaust control valves have a configuration that permits the exhaust port to be fully opened when the exhaust control valves are in one position and partially obstructed when the exhaust control valves are in their idle position, said exhaust control valves being configured so that the effective exhaust port opening is symmetric in at least one operative position other than the full throttle position of the exhaust control valves.

14. An engine as set forth in claim 13 wherein the effective exhaust port opening is symmetric at the full throttle position of the exhaust control valves in addition to at least one operative position other than the full throttle position.

15. An engine as set forth in claim 13 wherein the effective exhaust port opening is symmetric at mid-range performance.

16. An engine as set forth in claim 15 wherein the effective exhaust port opening is symmetric at the full throttle position of the exhaust control valves in addition to at least one operative position other than the full throttle position.

17. An engine as set forth in claim 13 wherein the effective exhaust port opening is symmetric at the idle condition.

18. An engine as set forth in claim 17 wherein the effective exhaust port opening is symmetric at the full throttle position of the exhaust control valves in addition to at least one operative position other than the full throttle position.

19. A multi-cylinder, two-cycle, crankcase compression internal combustion engine having a cylinder bock assembly defining a pair of adjacent cylinder bores having their axes lying in a common plane, a crankcase member positioned at one end of said cylinder block, scavenge port means comprising at least one scavenge passage extending from said crankcase to the respective cylinder bore, an exhaust port for each cylinder bore for discharging exhaust gases from the respective cylinder bore to the atmosphere, each of said exhaust ports being disposed so that a line passing from said cylinder bore axis through the center of the exhaust port is disposed in nonperpendicular relationship to the said common plane and at an acute angle measured in the same direction to a perpendicular plane containing the respective cylinder bore axis, a pivoted exhaust control valve for controlling the effective area and timing of opening of each of said exhaust ports, said exhaust control valves being pivotally supported for movement relative to the exhaust port so as to assume a non-symmetric effective area for said exhaust port in at least some operative positions of said exhaust control valves, said exhaust control valves being configured so that the effective exhaust port opening is symmetric in at least one obstructing position of said exhaust valves.

20. An engine as set forth in claim 19 wherein the effective exhaust port opening is symmetric at the full throttle position of the exhaust control valves in addition to at least one operative position other than the full throttle position.

21. An engine as set forth in claim 19 wherein the effective exhaust port opening is symmetric at mid-range performance.

22. An engine as set forth in claim 21 wherein the effective exhaust port opening is symmetric at the full throttle position of the exhaust control valves in addition to at least one operative position other than the full throttle position.

23. An engine as set forth in claim 21 wherein a spark plug is positioned in the cylinder bore and is offset toward the greater effective area of the exhaust port relative to the cylinder bore axis.

24. An engine as set forth in claim 19 wherein the lower surface of the exhaust control valve is curved in plan view and the upper surface of the exhaust port is curved.

25. An engine as set forth in claim 19 wherein the effective exhaust port opening is symmetric at the idle condition.

26. An engine as set forth in claim 25 wherein the effective exhaust port opening is symmetric at the full throttle position of the exhaust control valves in addition to at least one operative position other than the full throttle position.

27. An engine as set forth in claim 25 wherein the lower surface of the exhaust control valve is curved in plan view and the upper surface of the exhaust port is curved in plan view.

28. An engine as set forth in claim 27 wherein a spark plug is positioned in the cylinder bore and is offset toward the greater effective area of the exhaust port relative to the cylinder bore axis.

* * * * *